June 20, 1944.  E. F. MÜLLER  2,351,626
ELECTRIC FEELER CONTROL FOR MACHINE TOOLS
Filed Aug. 3, 1938  8 Sheets-Sheet 1

Fig.1

INVENTOR.
EDUARD FELIX MÜLLER.
BY Knight Bros
ATTORNEYS.

Inventor.
EDUARD FELIX MULLER.

By (signature)
Attorney.

June 20, 1944.   E. F. MÜLLER   2,351,626
ELECTRIC FEELER CONTROL FOR MACHINE TOOLS
Filed Aug. 3, 1938   8 Sheets-Sheet 4

Inventor.
EDUARD FELIX MULLER.
By Allscolcombe
Attorney

June 20, 1944.   E. F. MÜLLER   2,351,626
ELECTRIC FEELER CONTROL FOR MACHINE TOOLS
Filed Aug. 3, 1938   8 Sheets-Sheet 6

INVENTOR.
EDUARD FELIX MÜLLER.
BY
ATTORNEYS.

Fig. 12

Patented June 20, 1944

2,351,626

UNITED STATES PATENT OFFICE 2,351,626

ELECTRIC FEELER CONTROL FOR MACHINE TOOLS

Eduard Felix Müller, Leipzig, Germany; vested in the Alien Property Custodian

Application August 3, 1938, Serial No. 222,743
In Germany January 14, 1936

12 Claims. (Cl. 90—13.5)

This invention relates to electric feeler controls of machine tools for cutting a work piece in accordance with a pattern so as to obtain an exact duplicate of the pattern.

If the feeler control is mounted upon an existing milling machine, the milling cutter is fixed in the usual way on the milling machine spindle, and the guide sleeve is firmly clamped in the milling spindle head, so that the cutter assumes a fixed position, thus not being movable in the direction of the spindle axis. The feeler device is rigidly attached to the head-piece by means of a connecting arm and hence maintains a fixed spatial relation to the cutting tool.

The feed of the feeler occurs in the direction of the spindle axis. This control is effected by means of spindles, bevel wheels, worm and worm wheels. The guide feed is retained in the normal manner, but a friction coupling and a locking brake are provided, which, influenced by an oscillating switch, come into operation at a given moment and lock the longitudinal feed. Both movements, control in height and longitudinal feed, are separately derived each from an electric motor.

Two feeding movements are effective in the machining process, namely, the feeler feed and the pilot or guide feed. The feeler feed occurs in a direction to and from the object to be machined, while the guide feed moves longitudinally with respect to the object, i. e. at right angles to the feeler feed.

With larger types of machines, the feeler feed movement is preferably located in the milling cutter spindle carriages.

According to the invention, machine tools of the above-mentioned type are provided with an electric feeler control, in which a two-position feeler serves for controlling the feeler feed while the control of the guide feed is indirect and dependent upon the control movement effected by the feeler. More particularly, the guide feed movement is controlled in dependence upon the extent of the path traversed by the feeler. When operating with such a control, many closely adjacent points of the pattern are felt off and this closeness is adjustable by an oscillating switch and is dependent upon the choice of the speed of feed.

The movements of the feeler are:
(1) Towards the pattern,
(2) After contact with the pattern, away therefrom,
(3) After leaving the pattern, again towards it.

By means of this feeler which represents a double position switch, the control circuits are so influenced that a spot-shaped and exact feeling off is possible.

Machines to be provided with this control must permit a reversal of the main cutting feed so as to perform a reciprocating feed movement and also be provided for an adjustment of the feeding stroke. The machines must also allow effecting a subsidiary feed movement which occurs by a definite amount transverse to the main feed movement after each reciprocation.

According to a more specific aspect of the invention, the contour milling is effected by means of two round tables which are fixed to an angle iron at right angles to the working table and are mounted on the working table and are driven in the same way by a sliding shaft which is in connection with a locking brake and friction coupling. A bevel gearing connected with the guide sleeve of the milling spindle permits the milling cutter to function in the horizontal position and hence to permit the contour milling. This arrangement is particularly suitable for machining dies for drop presses and for the plastics industry or the like, and for the contour milling of cam discs corresponding to sheet metal templates.

The feeler is conveyed line by line over the surface of the pattern, and accordingly the tool over the work piece. At the end of each cut, a lateral forward movement or feed occurs equal to the width of a cut. The cutting movement takes place in the vertical direction and the stepwise feed forward in the horizontal direction.

In order that the present invention may be clearly understood an example of the general design, construction and manner of operation will be described with reference to the accompanying drawings, in which.

Figure 1:
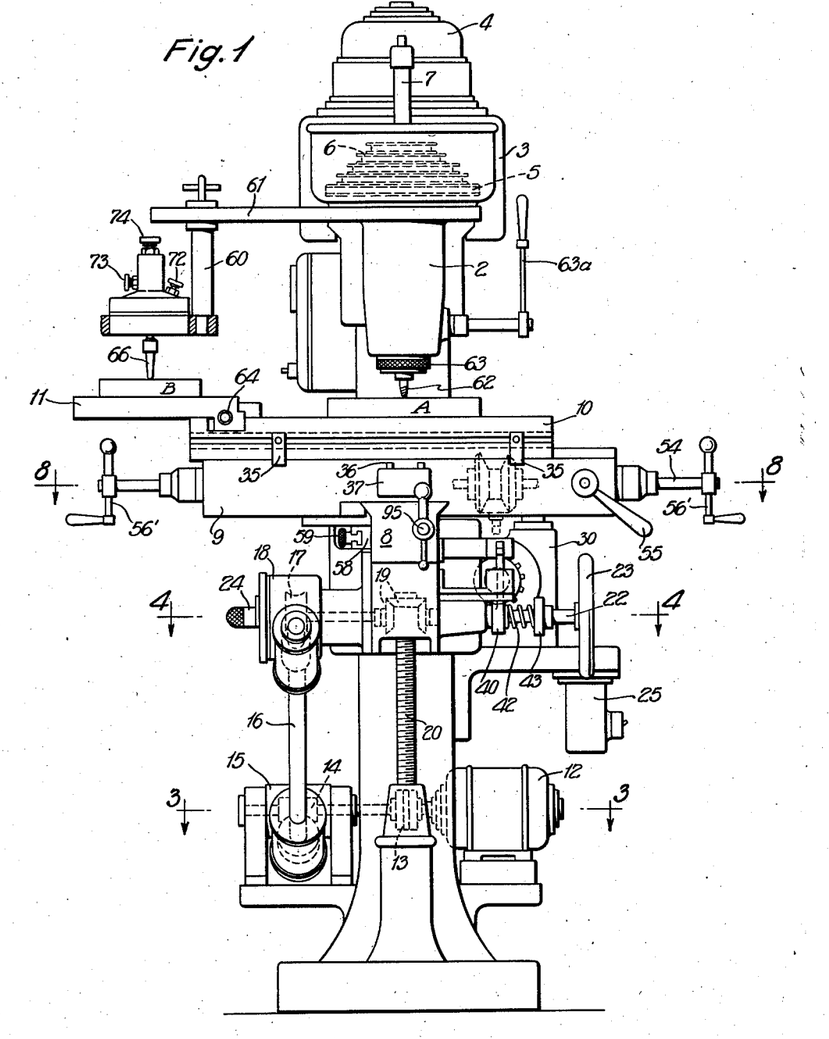
Fig. 1 is a front elevation of a machine tool.
Figure 2:
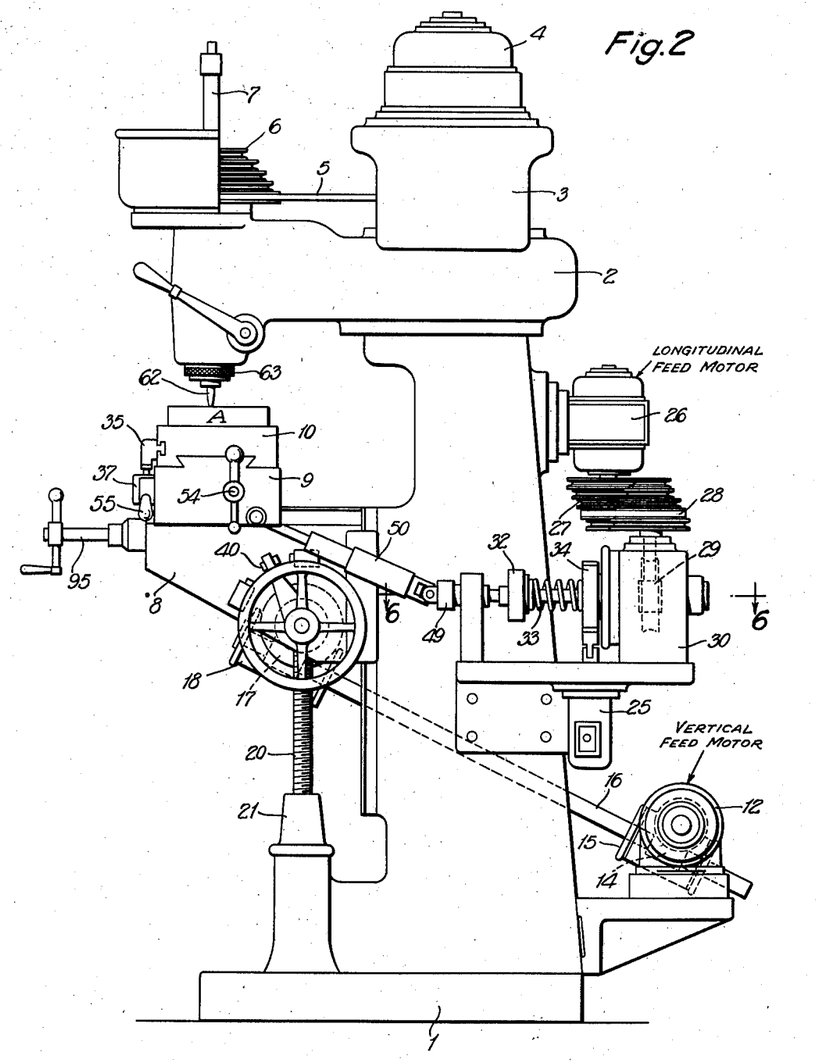
Fig. 2 is a side view of the machine shown in Fig. 1.

The machine itself is a normal milling machine (Figs. 1 and 2). Its stationary frame comprises a pedestal 1 and a headpiece 2. On the headpiece 2 is mounted a motor carrier 3 which supports a milling motor 4. This motor 4 drives a milling spindle 7 by means of a belt 5 and a stepped pulley 6. The machine is also provided with a support structure for accommodating a work piece and a pattern. The support is composed of a vertically movable main table 8, a cross slide 9 mounted thereon, a work table mounted to travel longitudinally on slide 9 and on which table the work piece A is clamped, and a pattern table 11 fixed on table 10 and which supports the pattern B.

Figure 11:
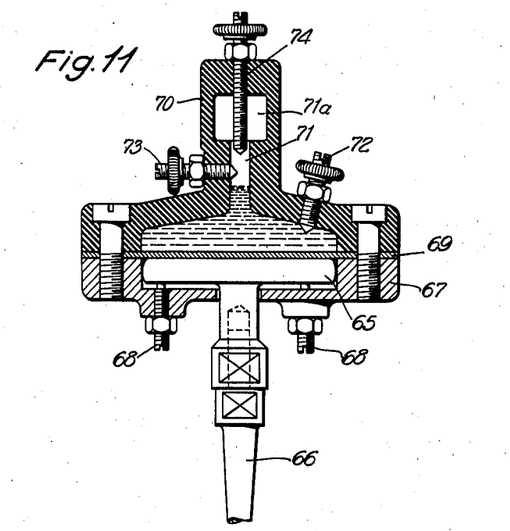
Fig. 11 is a vertical section through the feeler in larger scale.
Figure 12:
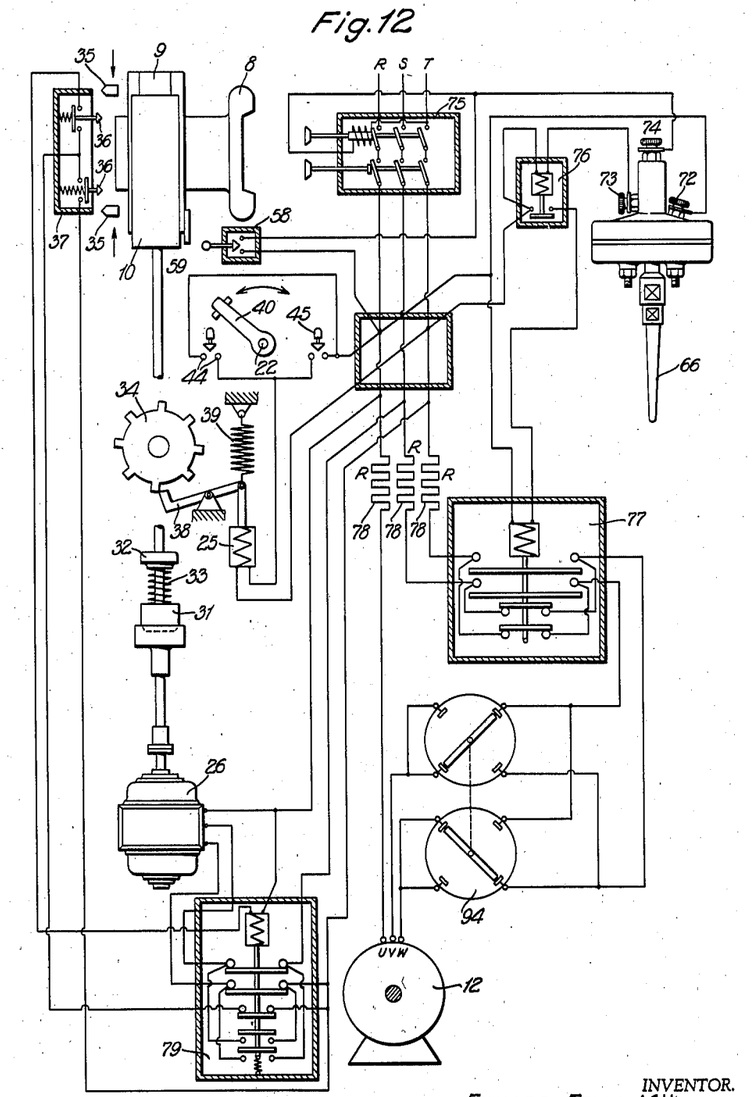
Fig. 12 shows the circuit diagram for three-phase current operation with a reversing motor for operating the milling machine.
Figure 13:
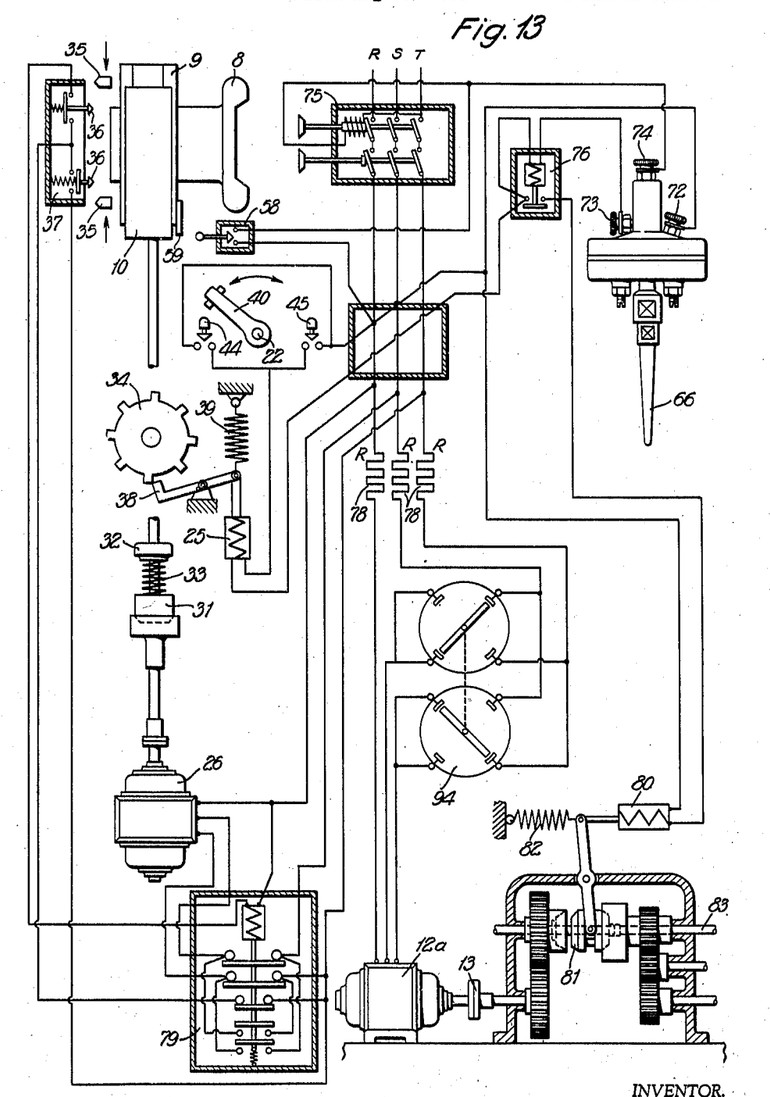
Fig. 13 is the circuit diagram for three-phase current operation with reversing gear.

The vertical movement of the table 8 is electrically controlled. When the working table 10 performs an upward or downward movement during the milling operation, a contact 73 shown in Fig. 11 is opened and closed, this contact controlling the vertical movement. According to this operating principle the pattern B, fixed on table 10, approaches and recedes from a feeler 66 described in more detail below, and which controls the contact 73 so that the current circuit of the contact 73 is closed when the feeler touches the pattern B and is opened again during the return movement of table 10 and so on. By means of this opening and closing of the current circuit, there is controlled through an auxiliary relay 76 (Figs. 12 and 13) a reversing relay 77 which influences a reversing motor 12 (Figs. 1, 2 and 12) in such a manner that clockwise or counterclockwise rotation thereof is suddenly initiated.

Figure 3:
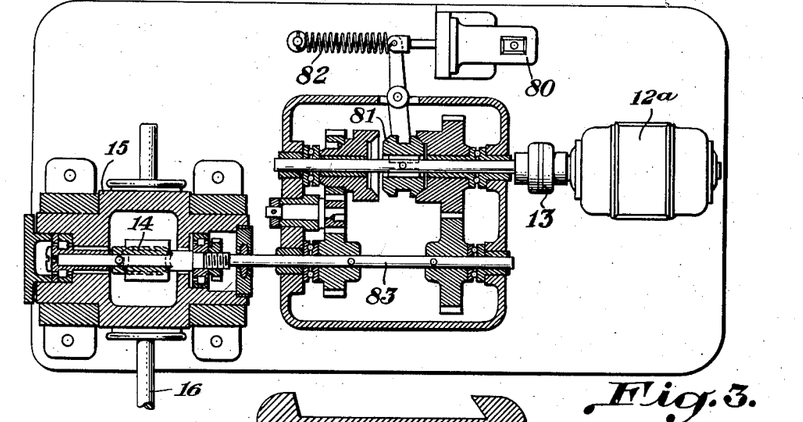
Fig. 3 is a sectional plan view on line 3—3 Fig. 1 showing the control with reversing gear and the transmission of the control movement to the lifting shaft.
Figure 4:
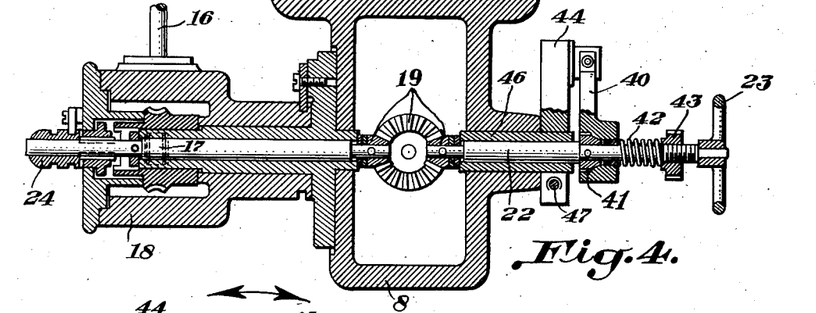
Fig. 4 is a sectional plan view on line 4—4 Fig. 1 showing the introduction of the control movement by the lifting shaft up to the bracket spindle and the oscillating switch arrangement.

In order to protect the motor 12 from excessive heating, a protective resistance 78 (Figs. 12 and 13) is provided in each phase. The reversing movement is transmitted from the motor 12 through a coupling 13 (Fig. 1) onto a lower worm gear 14, which is supported in a lower oscillatingly disposed housing 15 (Figs. 1, 2 and 3). A rising shaft 16 transmits the movement to an upper worm gear 17 (Figs. 1, 2 and 4) which is located in an upper oscillatingly disposed housing 18. By means of two bevel wheels 19, the movement is then transmitted to a bracket spindle 20 threaded into a bracket spindle nut 21. In this manner, the upward and downward movement of the main table 8 is attained.

In order that the vertical table 8 may also be moved manually, a bevel wheel shaft 22 (Fig. 4) is provided with a handwheel 23. In the upper tilting housing 18 a claw coupling 24 is mounted which permits the automatic vertical movement to be cut out and the table 8 to be shifted manually.

Figure 5:
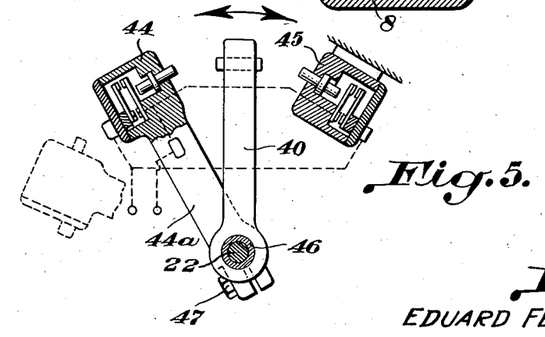
Fig. 5 shows the oscillatory switch partly in section.
Figure 6:
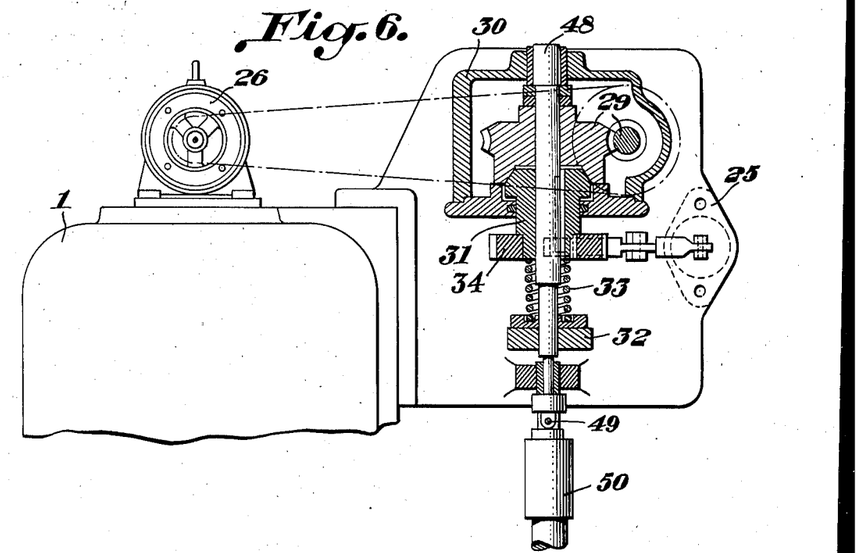
Fig. 6 is a sectional view of the drive and locking of the longitudinal feed taken on line 6—6 in Fig. 2.
Figures 7, 8:
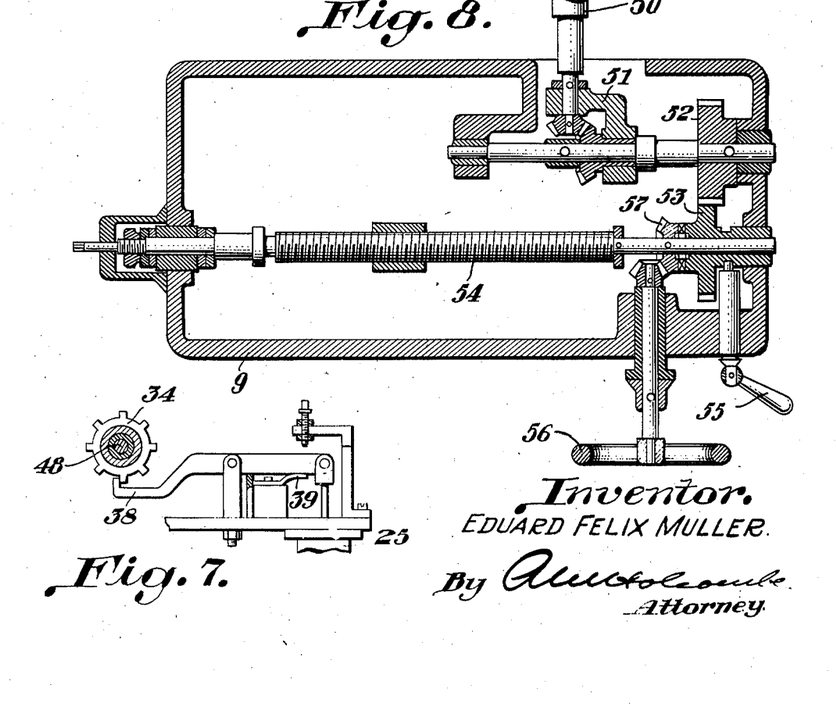
Fig. 7 shows the locking brake with brake magnet.
Fig. 8 is a sectional plan view of the driving mechanism parts for the movement of the table taken on line 8—8 Fig. 1.

In parallel to the current circuit which influences the vertical feed reversing motor 12, an oscillating switch 40—44 (Figs. 4 and 5) is actuated which controls the current circuit of a locking magnet 25 (Figs. 6 and 7) which is required for locking the longitudinal feed. The drive for the longitudinal feed is effected from a motor 26 (Figs. 2 and 6) which drives from a multi-stepped pulley 27 by way of a similarly stepped pulley 28 a worm gear 29 located in a worm bearing housing 30. The movement is transmitted to a cone clutch 31 (Fig. 6), which by means of a nut 32 and a spring 33 can be adjusted to a particular torque. A ratchet wheel 34 (see also Fig. 7) having straight rectangular teeth is keyed to the clutch core 31, so that locking can occur in both directions of rotation since the reversal of the working table 10 is effected by the motor 26.

The reversal is effected electrically. Stop cams 35 (Figs. 1, 2 and 12) which are fixed on the working table 10 press against push knobs 36 of a push button switch 37 which is screwed onto the cross slide 9. In this way a reversing relay 79 (Figs. 12 and 13) is influenced and the motor 26 is correspondingly reversed in polarity and thus changes its direction of rotation.

A locking lever 38 (Figs. 7, 12 and 13) in the form of a double-armed lever is set in operation after the locking, by a magnet 25. If the magnet 25 is de-energized, the locking lever 38 is drawn back by a spring 39 and the longitudinal feed again comes into operation. The oscillating switch 40—43 is driven by means of the bevel wheels 19 and shaft 22 from the bracket spindle 20 which causes the table 10 to oscillate vertically. As long as the feeler touches a level surface on the pattern, the oscillating switch lever 40, which is carried along by a cone clutch 41 (Figs. 4 and 5) actuated by the spring 42 and adjustable nut 43, oscillates between two contacts 44 and 45 only to a limited extent and without touching them. Even, however, in machining a level surface, the contact systems 44 and 45 can be touched, and this in the finishing and for increasing the accuracy. During the normal backward and forward oscillation of the switch lever within the aforementioned limited range, a locking of the longitudinal feed does not occur so that the working table 10 is moved backward and forward on the cross slide 9.

If the feeler pin 66, however, comes to a depression in the pattern of such dimensions that the extent of the previous rising movement of the table, which occurs only with a level surface, is exceeded, then the oscillating switch lever 40 performs an extended oscillation and thereby strikes against the contact 44 or 45, closes the current circuit of the locking magnet 25, so that the lock 34 and 38 comes into operation and stops the longitudinal feed until the feeler pin 66 abuts against the bottom of the depression. The table 10 thereupon immediately commences the return movement downwardly and the oscillating switch lever 40 then interrupts the contact 44 or 45 which has just been closed and the locking magnet 25 is de-energized. The return spring 39 (Figs. 7, 12 and 13) unlocks the longitudinal feed and the working table 10 again resumes its longitudinal movement.

The contact 45 (Figs. 4 and 5) of the oscillating switch 40—43 is firmly fixed on the table 9. The other contact 44 is connected to a lever 44a which is supported on a bush 46 and can thus be adjusted and then firmly clamped by a clamping screw 47. The reason for this adjustment will be explained below.

The automatic longitudinal table movement is transmitted from a clutch coupling shaft 48 (Figs. 6 and 8) onto a telescope shaft 50 through a universcal joint 49 and from the shaft 50 through a bevel gear 51 and two spur-wheels 52 and 53 onto the table spindle 54. If the working table 10 is to be adjusted in the longitudinal direction manually, it is necessary for the automatic longitudinal feed to be disengaged. This is effected by means of a coupling lever 55 which takes the spur-wheel 53 and the bevel wheel 57 out of engagement. The table can then be moved manually through a handwheel 56 (Fig. 8) or cranks 56' (as shown in Fig. 1).

On the table bracket 8 is provided a terminal switch 58 (Figs. 1, 12 and 13) which is actuated by a cam stop 59 adjustably clamped on the cross slide 9. This terminal switch 58 serves to attain a limited stroke in the transverse direction and to stop the working table 10 in any desired adjusted width of cut. As can be seen from the circuit diagrams of Figs. 12 and 13, this terminal switch 58 is electrically in series with the automatic switch 75 in the motor control circuit, so that the terminal switch 58 is in a position to stop the whole machine.

The feeler is constructed as a double position switch and is normally rigidly connected through a rotatable rod 60 and a connecting arm 61 to the headpiece 2 and thus normally always remains in fixed relation to the milling cutter 62. However the vertical relation between the feeler and the milling cutter 62 is variable by providing a movable milling cutter spindle guide sleeve 63, which is controlled by means of a conventional rack and pinion drive (not shown) operated by hand lever 63a. Furthermore, the feeler can be moved horizontally about the rod 60 and can be moved along the connecting arm 61 for properly spacing it from the cutter. An additional fine adjustment of the horizontal spacing between the feeler pin 66 and the milling cutter 62 is possible by finely adjusting the pattern table 11 by means of a spindle 64 (Fig. 1) with respect to the cross slide 9.

The feeler consists of a disc 65 (Fig. 11) having a central stud carrying the interchangeable feeler pin 66, which is threaded into it. Externally, the periphery of disc 65 is ground slightly spherical so as to permit the door to slightly tilt, and so that the feeler can easily glide over slight obstacles. The disc must, however, fit closely into the ring 67. On the flat bottom side, the disc 65 rests on three set screws 68 threaded into ring 67, whereby the feeler disc is positioned correctly in this ring. On the ring 67 and over the disc 65 is placed an elastic diaphragm 69 which is clamped near its circumference against ring 67 by a housing 70 (of insulating material). In the upwardly extending cylindrical portion of housing 70 is provided a bore 71 which widens downwardly and meets the dome-shaped main chamber of the housing located adjacent to diaphragm 69. The square of the ratio of the diameters (for instance 6 millimetres diameter of the bore at the top and 60 millimetres diameter of the chamber at the bottom gives the square of the ratio as $10^2 = 100$) then gives almost frictionless transmission.

In the hollow space of housing 70, is located the operating liquid, namely mercury, up to the level shown in Fig. 11. This arrangement works in a similar manner to the known hydraulic ram, which converts a small force into a large force. For with the feeler described, a small movement of the feeler is converted into a large travel of the displaced mercury in the narrow bore 71, so that it can be regarded as a hydraulic travel amplifier. The exact adjustment level is effected by screws 68 which are also adjusted to compensate for large temperature differences. If a slight pressure is applied to the feeler pin 66 vertically from below, or laterally, then the displacement causes the mercury to rise in the bore 71. By means of the screw 72, current is conveyed into the mercury. In the position of the feeler as shown, the auxiliary relay 76 (Figs. 12 and 13) and the reversing relay 77 are cut out. The pattern B approaches the feeler pin 66 and as soon as mechanical contact is made the mercury rises and contacts with the screw 73 which is also included in the relay circuit. The auxiliary relay 76 and the reversing relay 77 are energized and the motor 12 suddenly changes its direction of rotation. The working table 10 now moves away from the milling cutter 62 and the pattern table 11 away from the feeler pin 66, and the mercury again falls below the tip of the screw 73. The auxiliary relay 76 and also the reversing relay 77 are again de-energized. The polarity of the motor 12 is thereby reversed and the table 10 again riises towards the feeler pin 66, the cycle of operations being repeated. The screws 72 and 73 are provided with hard metal tips. On the failure of any intermediate apparatus, the mercury will rise, as soon as the feeler pin touches the pattern, until the screw 74 makes contact with the mercury. In this way the quick break release of the protecting switch 75 is set in operation and the entire current supply is cut off. Furthermore, the safety switch is provided with a bimetal release, so that the machine is also stopped on the occurrence of other faults caused for instance by racing of the milling spindle on the normal current being exceeded. The equalization of pressure in the feeler is effected by a widened portion 71a of bore 71.

Instead of providing the reversing motor 12, the reversing gear can be operated by a three-phase motor 12a (Fig. 3). The current circuit which in the embodiment with reversing motor controlled the reversing relay 77, now controls an electro-magnet 80 which attracts a reversing coupling 81. As soon as the current circuit is interrupted, the magnet 80 is deenergized and the spring 82 predominates and reverses the direction of rotation which the shaft 83 transmits to the lower worm gear 14 and onto the bracket 8.

Figure 9:
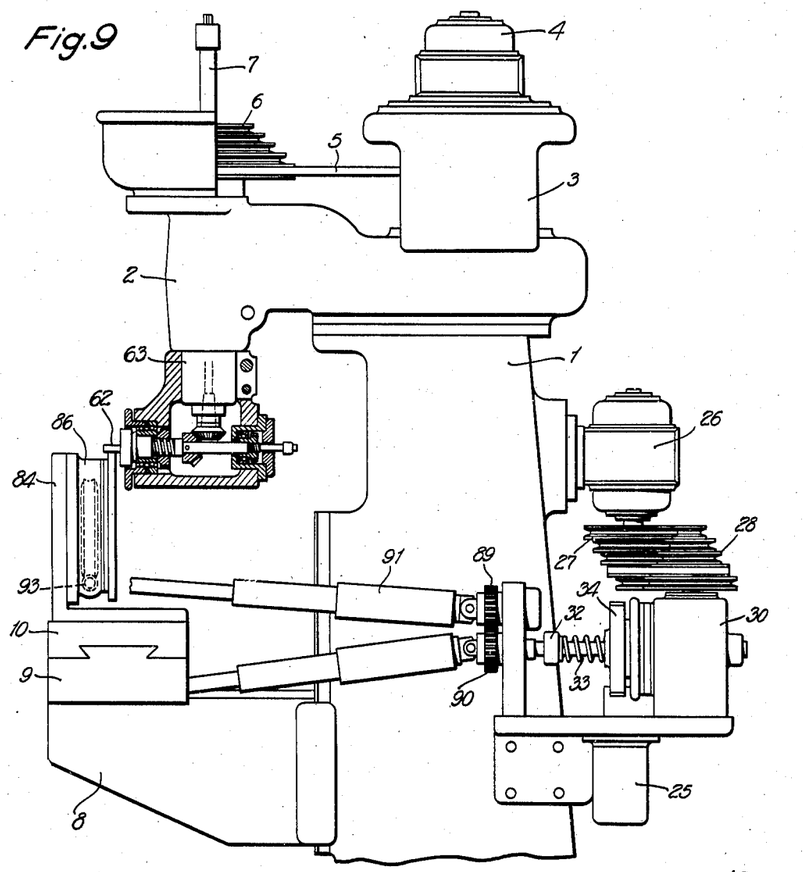
Fig. 9 shows the device for contour milling from sheet metal templates.
Figure 10:
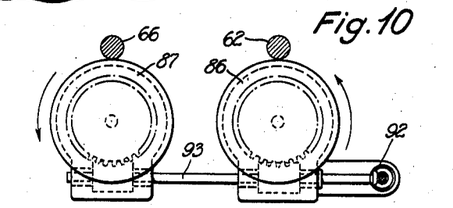
Fig. 10 shows the drive of the round table.

The contour milling (Figs. 9 and 10) is rendered possible by first setting the milling tool 62 into the horizontal position by substituting another headpiece 63 in which the tool is driven by a bevel wheel drive 85 as shown in Fig. 9. On the working table 10 is clamped an angle bracket 84 which carries two similarly driven round tables 86 and 87. One round table 86 carries the work piece, for instance, the cam disc 88 to be milled, and the sheet metal template is laid flat against the other round table 87. A feeler suitable for the horizontal position operates on the sheet metal template. The electric vertical movement for the table 10 is maintained the same as shown in Figs. 1 and 2. The automatic longitudinal movement with the clutch coupling 31—33 and locking device 25, 34 and 38, functions through two toothed wheels 89 and 90 on a second telescope shaft 91 which drives through two bevel wheels 92 the worm shaft 93 for operating the round tables 86 and 87.

With larger types of machines, the electric control is located in the transverse movement of the cross slide 9, and it thus acts on the transverse spindle 95 (Fig. 2), which moves the cross slide, that is, in the horizontal direction. The round tables 86 and 87 are then arranged horizontally on the working table 10 and are also driven by the automatic longitudinal movement with locks 25, 34 and 38 and clutch coupling 31—33.

Figure 9A:
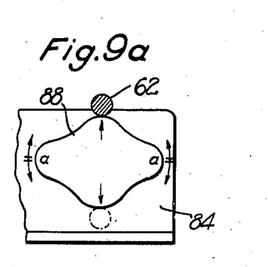
Fig. 9a is a sketch showing the manner of contour milling without the round table.

A reversing switch 94 is inserted in the current circuit in order that such parts as are actually to be machined on the round table in the contour milling process, can also be copied on the longitudinal table. The work 88 is clamped on the angle bracket 84 (Fig. 9a). Parallel thereto is fixed the sheet metal template and first of all the upper peripheral contour of the template is traced and its contour reproduced on the work piece 88 between the two points a, so that the electric vertical movement of the working table occurs from below upwards. The reversing switch 94 is then reversed and the lower contour of the template is traced again between the two points a and reproduced on work piece 88, whereby the electric vertical movement now, however, occurs from above downwards. By means of this arrangement, it is not necessary to provide two rotating tables but all similar articles can be copied in this way.

Finally, the diagrams shown in Figs. 14 and 15 will be explained.

During rough machining (Fig. 14) considerable importance is placed on a great amount of work and small accuracy. This can, in the first place, be attained by the selection of a high speed of feed, and secondly by the adjustment of the oscillating switch 40—43, in such a manner that the two contacts 44 and 45 are placed widely apart so that the longitudinal feed is not interrupted with the usual vertical control, and the oscillating switch lever 40 swings backward and forward without touching the contacts 44 and 45, so that it is immaterial whether the points to be traced are brought quite close together, since the locking of the table feed commences even before the electric vertical control has terminated. It is thus seen that the accuracy is not dependent upon the contact path and the play of the driving mechanism parts, but only upon the closeness of the points to be traced. This closeness can be regulated to any desired small value, the accuracy thus being extremely great.

Figure 14:
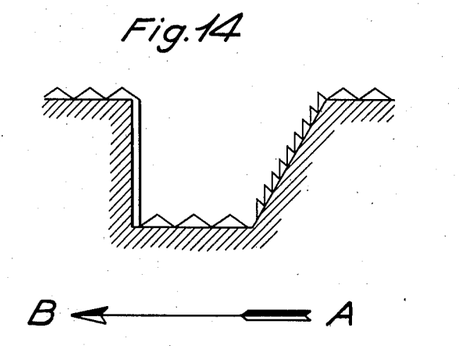
Fig. 14 shows in greatly enlarged scale a section through a portion of the rough machined article.
Figure 15:
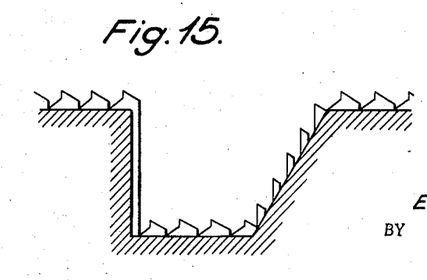
Fig. 15 shows a similar section through the article during the finishing process.

In the two Figs. 14 and 15 the points to be traced are shown wide apart for clarity in order that the method of working of this described arrangement can be understood. It is assumed that the working table 10 moves from A to B, that is, in the direction of the arrow.

What is claimed is:

1. An electrically actuated feeler control for machine tools having a feeler disposed in fixed relation to the operating tool of the machine, an operating table carrying the work piece and the pattern to be copied, means for oscillating the pattern and work piece on said table toward and away from the feeler and operating tool respectively so as to perform a multitude of reciprocations independent of the contour of the pattern, means controlled by the force of the contact between the feeler and the pattern for actuating said moving means to remove the table from the pattern and tool when the pattern touches the feeler and to again reverse the table movement as soon as the feeler and pattern are out of contact, separate means for normally longitudinally reciprocating the operating table within a desired range in a direction transversely to the feeler and operating tool to reproduce point by point the pattern contour on the work piece, and means actuated by the movement of said operating table toward and away from said feeler for arresting said longitudinal table motion when the feeler passes into a depression of the pattern and has oscillated beyond a given range until the feeler reaches the bottom of said depression and has caused the table to recede from the feeler.

2. An electrically actuated feeler control for machine tools having a feeler disposed in fixed relation to the operating tool of the machine, an operating table carrying the work piece and the pattern to be copied, means for oscillating the pattern and work piece on said table toward and away from the feeler and operating tool respectively so as to perform a multitude of reciprocations independent of the contour of the pattern, means controlled by the force of the contact between the feeler and the pattern for actuating said moving means to remove the table from the pattern and tool when the pattern touches the feeler and to again reverse the table movement as soon as the feeler and pattern are out of contact, separate means for normally longitudinally reciprocating the operating table within a desired range in a direction transversely to the feeler and operating tool to reproduce point by point the pattern contour on the work piece, two contacts and an oscillating lever disposed between said contacts which are spaced apart to determine a given operating range of said lever, means actuated by the table oscillating means for oscillating said lever between said contacts angular distances proportional to the oscillating distances of said table, and electric control means including said contacts and said lever for stopping said longitudinal table feed when the lever contacts with either contact, so that so long as the table and lever oscillate within ranges in which the lever does not touch its contacts the longitudinal table feed is maintained, but is interrupted when the table performs excessive oscillations in either direction due to deviations of the pattern surface from a given contour line.

3. An electrically actuated feeler control for machine tools having a feeler disposed in fixed relation to the operating tool of the machine, an operating table carrying the work piece and the pattern to be copied, means for oscillating the pattern and work piece on said table toward and away from the feeler and operating tool respectively so as to perform a multitude of reciprocations independent of the contour of the pattern, means controlled by the force of the contact between the feeler and the pattern for actuating said moving means to remove the table from the pattern and tool when the pattern touches the feeler and to again reverse the table movement as soon as the feeler and pattern are out of contact, separate means for normally longitudinally reciprocating the operating table within a desired range in a direction transversely to the feeler and operating tool to reproduce point by point the pattern contour on the work piece, two contacts and an oscillating lever disposed between said contacts which are spaced apart to determine a given operating range of said lever, means actuated by the table oscillating means for oscillating said lever between said contacts angular distances proportional to the oscillating distances of said table, electric control means including said contacts and said lever for stopping said longitudinal table feed when the lever contacts with either contact, so that so long as the table and lever oscillate within ranges in which the lever does not touch its contacts the longitudinal table feed is maintained, but is interrupted when the table performs excessive oscillations in either direction due to deviations of the pattern surface from a given contour line, and means for varying the distance between said contacts.

4. An electrically actuated feeler control for machine tools having a feeler disposed in fixed relation to the operating tool of the machine, an operating table carrying the work piece and the pattern to be copied, means for oscillating the pattern and work piece on said table toward and away from the feeler and operating tool respectively so as to perform a multitude of reciprocations independent of the contour of the pattern, means controlled by the force of the contact between the feeler and the pattern for actuating said moving means to remove the table from the pattern and tool when the pattern touches the feeler and to again reverse the table movement as soon as the feeler and pattern are out of contact, separate means for normally longitudinally reciprocating the operating table within a desired range in a direction transversely to the feeler and operating tool to reproduce point by point the pattern contour on the work piece, two contacts and an oscillating lever disposed between said contacts which are spaced apart to determine a given operating range of said lever, a sliding coupling connected between said lever and the table oscillating means for oscillating said lever between said contacts angular distances proportional to the oscillating distances of said table, and electric control means including said contacts and said lever for stopping said longitudinal table feed when the lever contacts with either contact, so that so long as the table and lever oscillate within ranges in which the lever does not touch its contacts the longitudinal table feed is maintained, but is interrupted when the table performs excessive oscillations in either direction due to deviations of the pattern surface from a given contour line.

5. An electrically actuated feeler control for machine tools having a feeler disposed in fixed relation to the operating tool of the machine, an operating table carrying the work piece and the pattern to be copied, means for oscillating the pattern and work piece on said table toward and away from the feeler and operating tool respectively so as to perform a multitude of reciprocations independent of the contour of the pattern, means controlled by the force of the contact between the feeler and the pattern for actuating said moving means to remove the table from the pattern and tool when the pattern touches the feeler and to again reverse the table movement as soon as the feeler and pattern are out of contact, an electric motor for normally longitudinally reciprocating the operating table within a desired range in a direction transversely to the feeler and operating tool to reproduce point by point the pattern contour on the work piece, a sliding clutch arranged between said table and said motor, electric means actuated by the movement of said table toward and away from said feeler for arresting said longitudinal table motion when the feeler passes into a depression of the pattern and has oscillated beyond a given range until the feeler reaches the bottom of said depression and has caused the table to recede from the feeler, whereby said sliding clutch yields at the arresting of the longitudinal table motion.

6. An electrically actuated feeler control for machine tools having a feeler disposed in fixed relation to the operating tool of the machine, an operating table carrying the work piece and the pattern to be copied, means for producing relative oscillatory motion between the pattern and work piece on said table on one hand and the feeler and operating tool respectively on the other hand so as to perform a multitude of reciprocations independent of the contour of the pattern, means controlled by the force of the contact between the feeler and the pattern for actuating said moving means to separate the table and tool when the pattern touches the feeler and to again reverse this motion as soon as the feeler and pattern are out of contact, separate means for normally longitudinally reciprocating the operating table within a desired range in a direction transversely to the feeler and operating tool to reproduce point by point the pattern contour on the work piece, and means actuated by the relative to and fro movement between said operating table and said feeler for arresting said longitudinal table motion when the feeler passes into a depression of the pattern and has oscillated beyond a given range until the feeler reaches the bottom of said depression and has caused a separation between the pattern and the feeler.

7. In a machine tool for cutting a work piece according to a pattern, the combination of a cutting tool, a touch-controlled feeler member capable of effecting a deflection movement when engaging and disengaging the pattern, said feeler member being arranged in a fixed relation to said tool, actuating means for effecting relative reciprocations between the pattern and the feeler member and between the operating tool and the work piece so as to perform a multitude of reciprocations independent of the contour of the pattern, contacts and step-up means associated with said feeler member for transferring said deflection movement into a contact movement of enlarged amplitude, electric control means connected between said contacts and said actuating means for controlling the amplitude of the reciprocations of said actuating means, drive means for effecting between the pattern and said feeler member and between the work piece and said tool a feed movement transversal to said reciprocations and unidirectional during a sequence of said reciprocations, arresting means associated with said drive means for interrupting said transversal feed movement, and adjustable control means connected with said reciprocating means for controlling said arresting means to interrupt said transversal feed movement in dependence upon said amplitude of said reciprocations exceeding an adjusted magnitude.

8. In a machine tool for cutting a work piece according to a pattern, the combination of a cutting tool, a feeler member arranged in a fixed relation to said tool and consisting of an electric touch-controlled two-position contactor movable relative to the pattern to be copied so as to be actuated when engaging and disengaging the pattern, power-operated means for effecting relative reciprocations between the pattern and the feeler member and between the operating tool and the work piece so as to perform a multitude of reciprocations independent of the contour of the pattern, electric circuit means connected between said contactor and said reciprocating means for varying the amplitude of said reciprocations in dependence upon the actuation of said contactor by said pattern, power-operated drive means for effecting between the pattern and said feeler member and between the work piece and said tool a feed movement transversal to said reciprocations and unidirectional during a sequence of said reciprocations, arresting means associated with said drive means for interrupting said transversal feed movement, and adjustable control means connected with said reciprocating means for controlling said arresting means to interrupt said transversal feed movement in dependence upon said amplitude of said reciprocations exceeding an adjusted magnitude.

9. In a machine tool for cutting a work piece according to a pattern, the combination of a cutting tool, a feeler member arranged in a fixed relation to said tool and consisting of a touch-controlled electric contactor movable relative to the pattern to be copied so as to be actuated when engaging and disengaging the pattern, power-operated means for effecting relative reciprocations between the pattern and the feeler member and between the operating tool and the work piece so as to perform a multitude of reciprocations independent of the contour of the pattern, electric circuit means connected between said contactor and said reciprocating means for varying the amplitude of said reciprocations in dependence upon the actuation of said contactor by said pattern, power-operated drive means for effecting between the pattern and said feeler member and between the work piece and said tool a feed movement transversal to said reciprocations and unidirectional during a sequence of said reciprocations, arresting means associated with said drive means for interrupting said transversal feed movement, a device for measuring the magnitude of said amplitude of said reciprocations, said device having a movable member and contacts adjustably arranged in the path of said movable member, a mechanism forming part of said reciprocating means and said device for imparting to said movable member a proportionally enlarged amplitude as compared with that of said reciprocations of said contactor relative to said pattern, and an electric control circuit connected between said measuring device and said arresting means for controlling said arresting means to interrupt said transversal feed movement in dependence upon said movable member engaging said adjustable contacts.

10. In a machine tool for cutting a work piece according to a pattern, the combination of a support for accommodating the work piece and the pattern, a cutting tool, a touch-controlled feeler member to be actuated by engagement with said pattern, said feeler member being arranged in a fixed relation to said cutting tool, power-operated actuating means controlled by said feeler for reciprocating said support so as to effect an oscillatory motion between said pattern and said feeler member and between said work piece and said tool, reversible drive means for producing a transversal feeding movement of adjustable rate of feed and of uniform direction during periods comprising an adjustable number of reciprocations, a mechanism disposed between said drive means and said support so as to form a transmission for imparting said feeding movement to said support, said mechanism including a device for interrupting and establishing said transmission for limited intervals within said periods, and means for controlling said device in dependence upon the amplitude of said reciprocations exceeding an adjusted magnitude.

11. In a machine tool having a pattern, and a tool for cutting a work piece according to the pattern, in combination, a touch-responsive feeler, means for producing a relative oscillatory feed movement between said feeler and said tool on the one hand and said pattern and said work piece on the other hand, means for superposing to said reciprocatory feed movement an intermittent progressive guide feed at a right angle to said reciprocatory feed so as to effect a resultant relative feed movement between said tool and said work piece along a stepped working curve, said touch-responsive feeler having a contact device with only two operative contact positions for directly controlling said reciprocatory feed, and control means independent of said contact device for controlling said intermittent guide feed in dependence upon the reciprocatory feeler feed movement.

12. In a machine tool having a pattern, and a tool for cutting a work piece when moving towards the work piece according to the pattern, in combination, a touch-responsive feeler, means for producing an oscillatory relative feed movement between said feeler and said tool on the one hand and said pattern and said work piece on the other hand, means for superposing to said reciprocatory feed movement an intermittent progressive guide feed at a right angle to said reciprocatory feed movement so as to effect a resultant relative feed movement between said tool and said work piece along a stepped working curve, said touch-responsive feeler having a contact device with only two operative contact positions for directly controlling said alternating feed, and control means independent of said contact device for controlling said intermittent guide feed in dependence upon said tool being out of engagement with said work piece, whereby said work piece is cut according to said pattern by a multitude of cutting operations occurring during the strokes towards said work piece of said reciprocatory feed movement.

EDUARD FELIX MÜLLER.